United States Patent [19]

Abiko et al.

[11] Patent Number: 4,785,241

[45] Date of Patent: Nov. 15, 1988

[54] ENCODER UNIT USING MAGNETORESISTANCE EFFECT ELEMENT

[75] Inventors: Shuzo Abiko, Chichibu; Hirokazu Goto, Hanno; Masakazu Kuhara; Hideto Sano; Hisanori Hayashi; Takeshi Osato, all of Chichibu, Japan

[73] Assignee: Canon Denshi Kabushiki Kaisha, Chichibu, Japan

[21] Appl. No.: 893,215

[22] Filed: Aug. 5, 1986

[30] Foreign Application Priority Data

Aug. 8, 1985 [JP] Japan .................................. 60-173287
Sep. 13, 1985 [JP] Japan .................................. 60-201617
Sep. 13, 1985 [JP] Japan .................................. 60-201618

[51] Int. Cl.$^4$ .............................................. G01B 7/14
[52] U.S. Cl. .................................... 324/208; 324/262
[58] Field of Search ............... 324/207, 208, 252, 226, 324/260, 262; 338/32 R, 32 H; 340/870.31; 307/309

[56] References Cited

U.S. PATENT DOCUMENTS

| | | | |
|---|---|---|---|
| 3,993,946 | 11/1976 | Makino | 324/208 |
| 4,274,053 | 6/1981 | Ito et al. | 324/208 X |
| 4,319,188 | 3/1982 | Ito et al. | 324/208 X |
| 4,403,187 | 9/1983 | Takahashi et al. | 324/208 |
| 4,429,276 | 1/1984 | Narimatsu et al. | 324/252 X |
| 4,506,220 | 3/1985 | Sawada et al. | 324/252 |
| 4,551,676 | 11/1985 | Amemiya et al. | 324/174 X |
| 4,589,038 | 5/1986 | Radtke | 324/207 X |
| 4,599,561 | 7/1986 | Takahashi et al. | 324/252 X |

FOREIGN PATENT DOCUMENTS 54-156656 12/1979 Japan ................................. 324/208

Primary Examiner—Reinhard J. Eisenzopf
Assistant Examiner—Warren S. Edmonds
Attorney, Agent, or Firm—Spencer & Frank

[57] ABSTRACT

An encoder unit comprising an object to be detected having a track having a first region with a magnetization pattern at a predetermined pitch and a second region having no periodic magnetization pattern, and a detector having a magnetoresistance effect element arranged in the direction which intersects the direction of the magnetic flux of the magnetization pattern and in opposed relationship with the object to be detected. The encoder unit is simple in construction yet capable of detecting the position of the object to be detected with a higher degree of accuracy than conventional encoders.

6 Claims, 15 Drawing Sheets

| ADDRESS | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 1ST BIT | 0 | 1 | 1 | 0 | 0 | 1 | 1 | 0 | 0 | 1 | 1 | 0 | 0 | 1 | 1 | 0 |
| 2ND BIT | 0 | 0 | 1 | 1 | 1 | 1 | 0 | 0 | 0 | 0 | 1 | 1 | 1 | 1 | 0 | 0 |
| 3RD BIT | 0 | 0 | 0 | 0 | 1 | 1 | 1 | 1 | 1 | 1 | 1 | 1 | 0 | 0 | 0 | 0 |
| 4TH BIT | 0 | 0 | 0 | 0 | 0 | 0 | 0 | 0 | 1 | 1 | 1 | 1 | 1 | 1 | 1 | 1 |

ENCODER UNIT USING MAGNETORESISTANCE EFFECT ELEMENT

BACKGROUND OF THE INVENTION

1. Field of the Invention

The present invention relates to an encoder unit and more particularly to an encoder unit using a magnetoresistance effect element in order to detect a the relative position between an object to be detected and a detector, the velocity of an object to be detected and so on.

2. Description of the Prior Art

Magnetoresistance effect elements (to be referred to as "MR elements" hereinafter in this specification) can detect a variation in an applied magnetic field in terms of the variation in electrical resistance of a magnetic thin film element such as Ni-Fe, Ni-Co or the like. Therefore, when sensors using MR elements are used as various encoders, it suffices only to provide a magnetic-field generating means such as a permanent magnet so that encoder units which are simpler in construction and have a higher degree of durability as compared with a photosensor which inevitably requires an electric power supply and a consumable light source such as a light-emitting diode can be provided. Recently office equipment such as magnetic disc devices, printers and the like have been increasingly used in various fields so that the demand for rotary encoder units used for controlling rotational speed or detecting a position has been remarkably increased. At present, almost all rotary encoder units are of the optical type, but the use of magnetic rotary encoder units has been also increased because, in addition to the above described advantages that they are simple in construction and have a high degree of durability, have a higher resolution, a faster response time and a high degree of reliability in case of accumulation of dust particles and frost and are inexpensive to manufacture.

FIG. 1 is a perspective view illustrating a prior art rotary encoder unit. The rotary encoder unit comprises a rotor 1, mounted on a rotating shaft 2 coaxially therewith having a cylindrical surface which is divided into a plurality (three in FIG. 1) of tracks 3A-3C and a detector 4 composed of a plurality of MR sensors 4A-4C which are mounted on a base plate 5 in opposed relationships with the respective tracks 3A and 3C. The tracks 3A-3C have magnetization patterns magnetized in the opposite directions at different pitches, respectively, and the leakage fluxes from the magnetization patterns are detected by MR sensors so that the absolute position and rotational speed of the rotor 1 can be determined. A circuit as shown in FIG. 2 is used to detect a variation in the magnetic field resulting from the rotation of the rotor 1. A resistor $R_1$ in FIG. 2 corresponds to the resistance of MR sensors 4A-4C shown in FIG. 1 and is connected in series with a temperature compensation resistor $R_2$ whose temperature coefficient of electrical resistance is equal to that of the resistor $R_1$. The resistors $R_1$ and $R_2$ are connected to resistors $R_3$ and $R_4$ across which is applied a voltage of a power supply E so as to establish a reference voltage, whereby a bridge circuit is provided. A differential amplifier A detects the voltage difference between voltage dividing points in the bridge circuit so that a variation in a magnetic field is derived as an electrical signal.

FIG. 3 shows the leakage magnetic fluxes from the magnetization pattern in the cases of the track 3A. The density of leakage fluxes 6 at the center of the magnetization pattern is lower than that at the ends of the magnetization pattern. When the magnetization patterns having various period are provided in order to detect the absolute position of the rotor 1 as shown in FIG. 1, the longer the period of a magnetization pattern, the lower the density of the leakage fluxes becomes at the center of the magnetization pattern. In the case of a magnetization pattern having a long period as shown in FIG. 4, the MR sensor can detect the magnetic fields at the end portions X, but cannot detect the magnetic field at the center portion Y. As a result, the prior art rotary encoder unit of the type described above has the disadvantage that when the rotor 1 is stopped at a position in which the center portion Y of the magnetization pattern is in opposed relationship with the MR sensor, it becomes impossible to accurately detect the position of the rotor 1.

FIG. 5 shows another prior art encoder unit. In FIG. 5, reference numeral 11 represents a motor for controlling the rotation and a magnetic drum 12 whose cylindrical surface is made of a magnetic medium is directly connected to the shaft 11A of the motor 11. Each of tracks 13A-13D on the magnetic drum 12 has a predetermined gray code pattern consisting of magnetized and demagnetized regions. A detector 14 including MR sensors 14A-14D and disposed adjacent to the cylindrical surface of the drum 12 detects a pattern and delivers an electrical signal in response to which the rotation of the motor 11 is detected.

FIG. 6A shows an example of a four-bits gray code recorded on the magnetic drum 12 shown in FIG. 5. FIG. 6B shows a development of the cylindrical surface of the magnetic drum 12 and the hatched areas are regions in which are recorded magnetization patterns which are repeatedly reversed in magnetization at a predetermined pitch while the white areas are the regions which are not magnetized (or which are demagnetized).

In the prior art rotary encoder unit of the type described above, a magnetized region 31 and an unmagnetized region 32 are defined as shown in FIG. 7. Therefore, at the boundary 33 between these two regions 31 and 32, the magnetic flux distribution 34 is widely expanded as compared with the magnetic flux distribution 35 at the portions which are continuously magnetized. Therefore, the prior art rotary encoder units cannot attain a satisfactory accuracy in detection.

As shown in FIG. 6B, in the case of the formation of a gray code, the unmagnetized regions and the magnetized regions must be juxtaposed in the adjacent tracks. In this case, in order to avoid interference between the magnetic fields, the adjacent tracks must be spaced apart from each other by a predetermined distance so that it is difficult to provide a magnetic drum which is compact in size.

FIG. 8 shows a further prior art rotary encoder unit. Reference numeral 41 represents a rotor whose cylindrical surface has a magnetization pattern 42. The magnetization pattern 42 includes an incremental layer 42A used for detection of the direction of rotation, the angle of rotation and the rotational speed of the rotor. The magnetization pattern 42 is comprised of a magnetization pattern at a predetermined pitch and an index layer 42B used for the detection of a reference position of the rotor. MR sensors 43A and 43B are mounted on a base 45 of a detector 44 in opposed relationships with the incremental layer 42A and the index layer 42B, respectively, and are spaced apart therefrom by a predetermined distance.

In general, the electrical resistance of an MR element varies as a function of the angle between the direction of magnetization and the direction in which current flows through the element. That is, the resistance $R(\theta)$ is given by $$R(\theta) = Ra \sin^2\theta + Rb \cos^2\theta$$

where Ra is the electrical resistance of the MR element when a magnetic field is applied in parallel with the current;

Rb is the electrical resistance of the MR element when a magnetic field is applied perpendicular to the direction of the current; and $\theta$ is the angle between the direction of magnetization and the direction of the current.

In the case of an encoder unit, an MR element has a unidirectional anisotropy and a magnetic field H is applied perpendicular to the direction of the current I flowing through the element so that the variations in the magnetic field are obtained in terms of the variations in resistance of the MR element.

The magnetic flux distributions in the index layer 42B and the incremental layer 42A shown in FIG. 8 are shown in FIG. 9. In the incremental layer 42A, the direction of magnetization is continuously reversed so that the same magnetic poles are adjacent to each other. As a result, the magnetic flux 46 becomes narrow because of the repulsion between the same poles. The index layer 42B has only one magnetization pattern with the S and N poles so that the magnetic flux 47 is expanded. Therefore, the detection signals obtained by the MR sensors 43A and 43B of the type described above become as shown in FIGS. 10A and 10B. FIG. 10A shows the detection signal obtained in response to the reproduction output of the MR sensor 43A while FIG. 10B shows the detection signal obtained in response to the reproduction output of the MR sensor 43B. The waveform of the detection signal obtained by the MR sensor 43B for detecting the index layer is expanded as compared with the waveform of the detection signal expected to be obtained from the magnetization pattern of the index layer 42 as shown in FIG. 10C. When the waveform of the signal detecting the index layer 42B is widened as described above, there arise the problem that an error occurs in timing for detecting an index pulse depending upon the direction of rotation of the rotor 41.

It is preferable that the output waveform of the index layer is similar in resolution to the output waveform from the incremental layer as shown in FIG. 10C, and it is preferable that the output waveform derived from the index layer become a pulse whose pulse width is narrower than that of the pulses derived from the incremental layer.

SUMMARY OF THE INVENTION

In view of the above, one of the objects of the present invention is to provide an encoder unit capable of detecting the position of an object to be detected with a higher degree of accuracy in a more reliable manner without being influenced by the relative position between the rotor and MR elements.

Another object of the present invention is to realize an encoder unit which is simple in construction yet capable of detecting with a high degree of accuracy and which can be made compact in size as a whole.

A further object of the present invention is to realize an encoder unit in which the expansion of the magnetic flux for detecting a reference position of an object to be detected is converged or narrowed so that the detection error can be minimized.

In the first aspect of the present invention, an encoder unit comprises:

an object to be detected which has a plurality of tracks each having a first region having a magnetization pattern at a predetermined pitch and a second region having no periodic magnetization pattern; and a detector for detecting the object to be detected having a plurality of sensors using a magnetoresistance effect element disposed in opposed relationship with the object to be detected and oriented in the direction which intersects the direction of the magnetic flux of the magnetized pattern of the first region.

Here, each of the plurality of sensors may comprise a plurality of unit magnetoresistance effect elements which are equidistantly spaced apart from each other and which are connected in series. The spacing between adjacent elements is one quarter of the length of the period of the magnetization pattern.

The number n of the unit magnetoresistance effect elements of each sensor is given by $$n = P/p$$

where 2P is the pitch of the magnetization pattern and p is the pitch of the plurality of unit magnetoresistance effect elements. Each sensor using magnetoresistance effect element can be connected in series to a resistor made of a material having the same temperature coefficient of electrical resistance as that of the magnetoresistance effect element.

In the second aspect of the present invention, an encoder unit comprises:

an object to be detected having a track formed with a first magnetization pattern and a second magnetization pattern whose direction of magnetization can be different from that of the first magnetization pattern; and a sensor for detecting the object to be detected having a magnetoresistance effect element disposed in opposed relationship with the object to be detected and oriented in the direction which intersects the direction of the magnetic flux of the first magnetization pattern.

Here, the sensor may comprise a plurality of unit magnetoresistance effect elements which are equidistantly spaced apart from each other and which are connected in series. The direction of magnetization of the second magnetization pattern can be inclined relative to the direction of relative movement between the object to be detected and the sensor.

The direction of magnetization of the second magnetization pattern can be inclined by an angle $\theta$ given below relative to the longitudinal direction of the track $$\theta = \tan^{-1}(2ip'/W)$$

where W is the width of the track, p' is the pitch of the second magnetization pattern, and i is an integer except zero.

Here, the object to be detected may also have another track(s) parallel with the track and the sensor can have another magnetoresistance effect element(s) opposed to the another track(s), the direction of magnetization of the magnetization patterns on the adjacent tracks of the plurality of tracks can be the same while the angle of inclination of the second magnetization patterns relative to the direction of magnetization of the first magnetization pattern on the adjacent tracks can be the same.

The object to be detected may further have another track(s) parallel with the track and the sensor can have another magnetoresistance effect element(s) opposed to the another track(s), the direction of magnetization of the magnetization patterns on the adjacent tracks of the plurality of tracks can be the same while the directions of magnetization of the second magnetization patterns on the adjacent tracks can be inclined in the opposite directions relative to the direction of magnetization of the first magnetization pattern.

In the third aspect of the present invention, an encoder unit comprises:

an object to be detected having a first track with a first magnetization pattern and a second track with a second magnetization pattern consisting of a first magnetized region for detecting a reference position and a second magnetized region which have a recording wavelength shorter than that of the first magnetized region and which is disposed on both sides of the first magnetized region in such a way that the same poles of the first magnetized region and the second magnetized regions are located adjacent to each other;

and a detector having a plurality of magnetoresistance effect elements disposed in opposed relationship with the object to be detected and oriented in the direction which intersects the directions of the magnetic fluxes of the first and second magnetized pattern.

Here, the plurality of magnetoresistance effect elements may comprise a plurality of unit magnetoresistance effect elements which are equidistantly spaced apart from each other and which are connected in series. The second magnetized region can be defined in the whole second track except the first magnetized region for detecting a reference position.

The second magnetized region can be defined on both sides of the first magnetized region for detecting a reference position in contact therewith.

In the fourth aspect of the present invention, an encoder unit comprises:

an object to be detected on which surface a track having a first magnetized pattern with first period of repeated magnetization and a second magnetized pattern with the second period shorter than the first period of repeated magnetization is provided; and a detector for detecting the object to be detected having a magnetoresistance effect element disposed in opposed relationship with the object to be detected and oriented in the direction which intersects the direction of the magnetic fluxes of the first magnetized pattern.

Here, the direction of the magnetization of the first magnetized pattern and the direction of the magnetization of the second magnetized pattern can be the same.

The above and other objects, effects, features and advantages of the present invention will become more apparent from the following description of preferred embodiments thereof taken in conjunction with the accompanying drawings.

BRIEF DESCRIPTION OF THE DRWINGS

FIG. 6A shows an example of gray code;

FIG. 6B is a developed view showing a magnetization pattern defined based on the gray code shown in FIG. 6A;

DETAILED DESCRIPTION OF PREFERRED EMBODIMENTS

Figure 1:
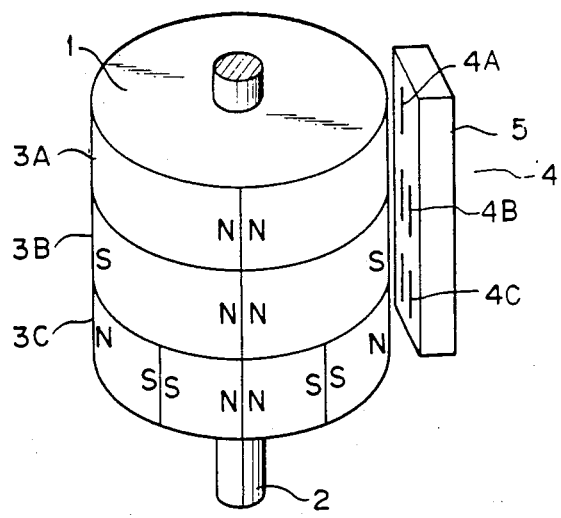
FIG. 1 is a perspective view illustrating a prior art rotary encoder unit.
Figure 2:
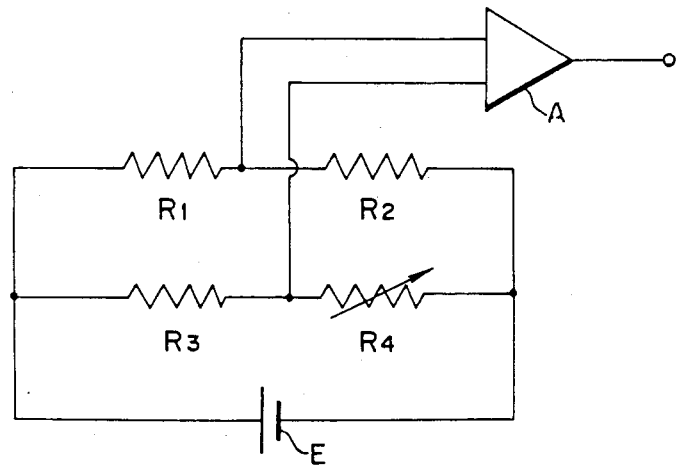
FIG. 2 is a diagram of a detection circuit using an MR element.
Figure 3:
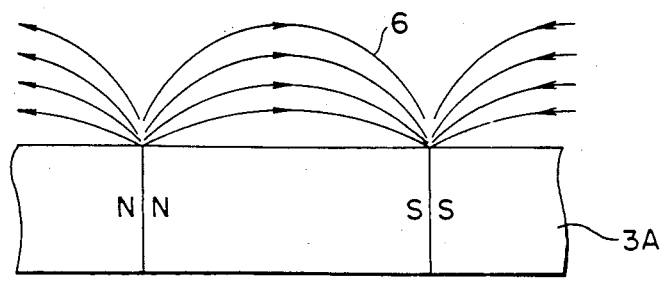
FIGS. 3 and 4 are developed views used to explain the magnetic fluxes produced from respective magnetization patterns.
Figure 4:
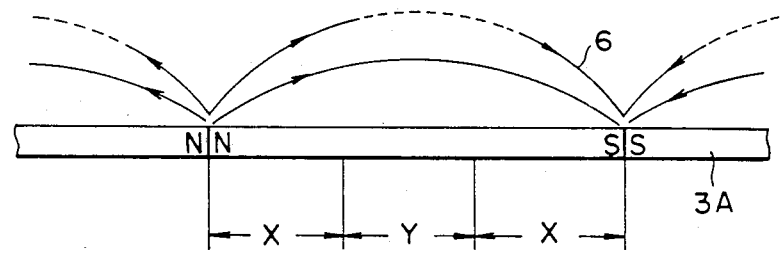
Figure 11:
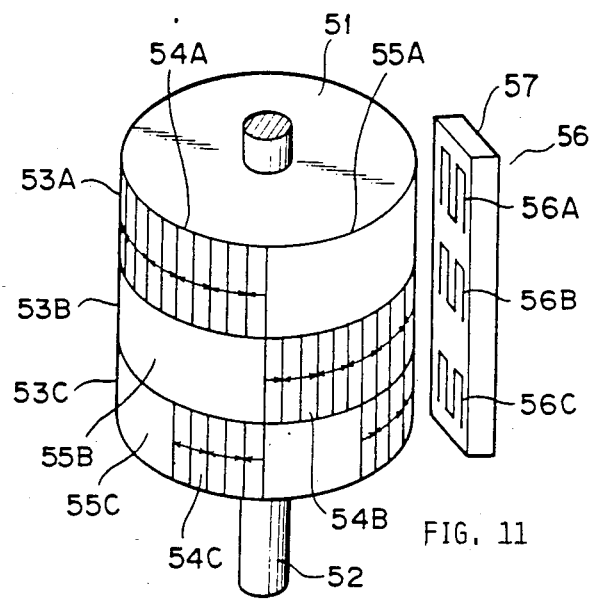
FIG. 11 is a perspective view illustrating a first embodiment of an encoder unit in accordance with the present invention.
Figure 12:
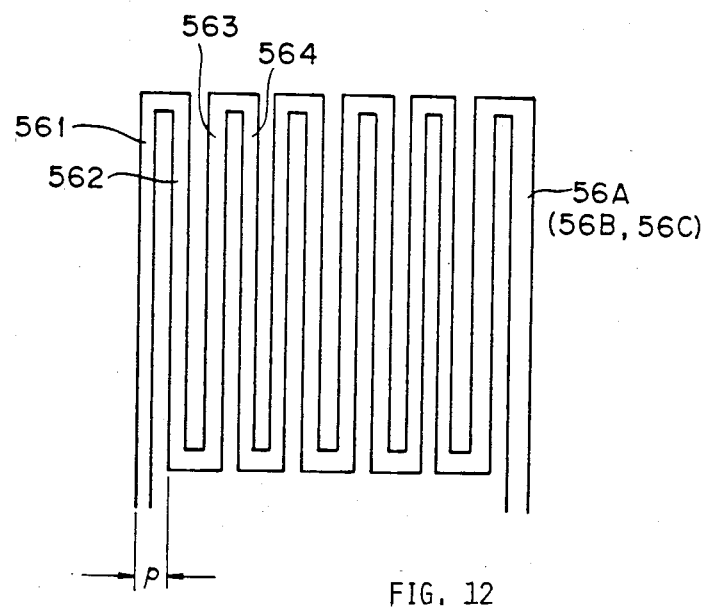
FIG. 12 is a top view showing an MR element.

FIG. 11 shows a first embodiment of a rotary encoder unit in accordance with the present invention. The cylindrical surface of a rotor 51 mounted on a rotating shaft 52 is formed with three tracks 53A-53C. While the prior art rotary encoder unit as shown in FIG. 1 has tracks 3A-3C having magnetization patterns each with a different period, the tracks 53A, 53B and 53C of this embodiment have the magnetized regions 54A, 54B and 54C each having a magnetization pattern with a predetermined pitch and the regions 55A, 55B and 55C (to be referred to as "demagnetized regions" hereinafter in this specification) which are demagnetized or which have no periodic magnetization pattern. The magnetized regions 54A-54C and the demagnetized regions 55A-55C of the three tracks 53A-53C have weighted peripheral pitches so that the absolute position of the rotor 51 can be detected in terms of an absolute address. Three MR sensors 56A, 56B and 56C are mounted on a base plate 57 of a detector 56 in opposed relationships with the tracks 53A, 53B and 53C, respectively. The MR sensors 56A-56C have their axes of easy magnetization perpendicular to the direction of the magnetic fluxes produced by the magnetized regions 54A-54C. As shown in FIG. 12, each of the MR sensors 56A-56C is a thin film having a zig-zag pattern with a pitch p which is formed by depositing an alloy such as Fe-Ni or Ni-Co and then etching the deposited film. Alternatively, individual unit elements 561, 562 and so on of each MR sensor are formed independently and then electrically interconnected by an additional step. Such MR sensor may be considered as comprising a plurality of unit MR elements 561, 562, 563 and so on which are arranged at a pitch p and connected in series. Each of the MR sensors 56A-56C is incorporated into the detection circuit described above with reference to FIG. 2.

Figure 13:
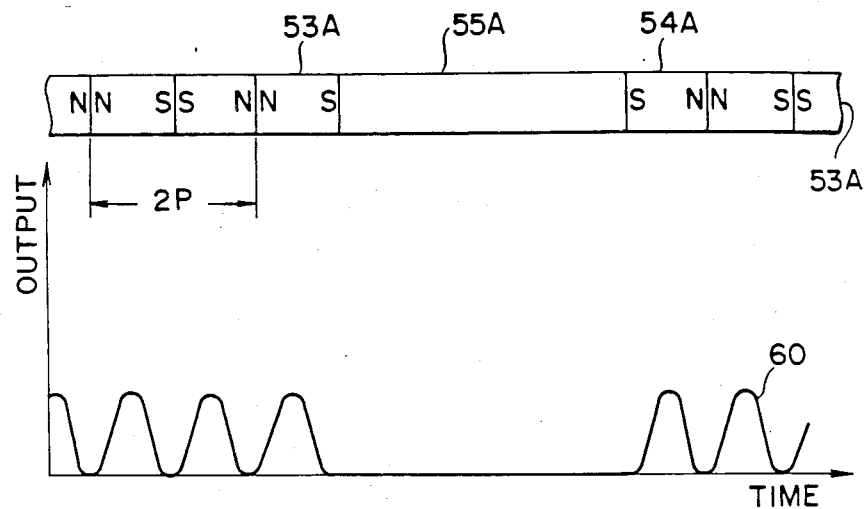
FIGS. 13, 14 and 15 show the output waveforms derived from the encoder unit shown in FIG. 11.
Figure 14:
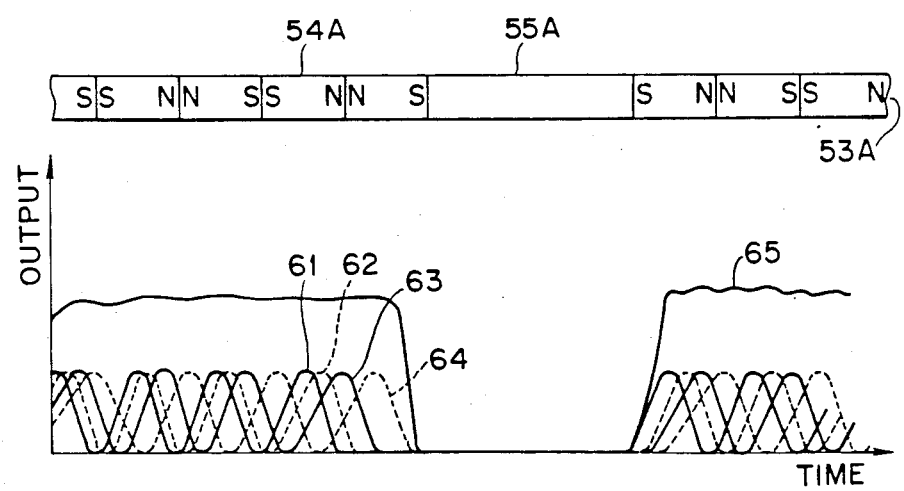

When the rotor is rotated to scan the track 53A consisting of, as shown in FIG. 13, the magnetized regions 54A having a magnetization period equal to 2P and the demagnetized regions 55A, the output becomes zero at a pitch P which is equal to one half of the magnetization pitch 2P as shown in FIG. 13.

Therefore, the waveform of the output derived from the MR sensor 56A becomes a waveform 65 obtained by combining the waveforms 61, 62, 63 and so on which are derived from the unit elements 561, 562, 563 and so on and which are out of phase by an angle corresponding to the pitch p. That is, when the magnetized regions 54A and the demagnetized regions 56A are scanned, an output whose waveform is substantially similar to a rectangle can be obtained. The same is true for the other tracks 53B AND 53C. The combined output is greater than that obtained by the prior art encoder unit and sharply rises and falls at the boundaries between the magnetized and demagnetized regions. In addition, the pitch of the magnetization pattern remains constant and there is no magnetization pattern with a long period. As a result, there is no fear at all that the detection becomes unstable depending upon the position of the MR sensor as in the case of the prior art encoder unit described above with reference to FIG. 1. In other words, the position or the rotational speed can be detected with a high degree of accuracy regardless of the position of the MR sensor.

Meanwhile with the above-described construction, it is preferable that, in order to detect the position and the rotational speed, it is preferable that the output from the MR sensor is similar to a rectangular waveform as much as possible. Therefore, the experiments were conducted in which while the magnetization pitch 2P of the magnetized regions remains unchanged, the number of unit elements 561, 562, 563 and so on which are spaced apart from each other by the pitch p is varied. The experimental results are shown in FIG. 15.

Figure 15:
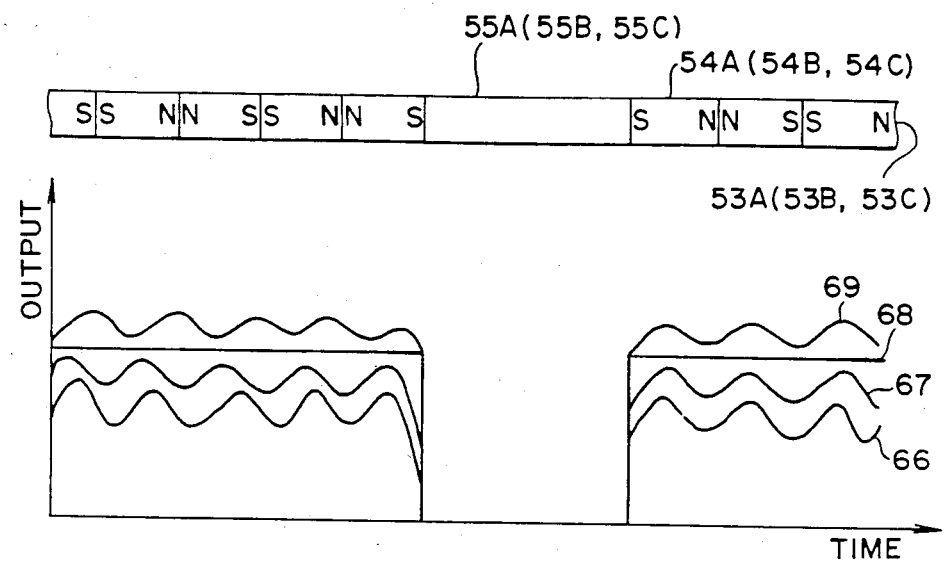

FIG. 15 shows the results when P=10p; that is, when the pitch p of the unit elements 561, 562, 563 and so on is equal to 1/10 of a half of the pitch 2p of the magnetized regions 54A-54C. Reference numerals 66, 67, 68 and 69 show the total output waveforms derived from the MR sensors consisting of 6, 8, 10 and 12 unit elements, respectively. Of these waveforms, the waveform 68 is most similar to a rectangular waveform and is therefore preferable. Thus, preferably the number n of the unit elements of the MR sensor is equal to 10. In general, when there exists the relationship of P=np, it is preferable to form an MR sensor consisting of the number n of unit elements. In other words, each of the MR sensors 56A-56C must be so designed and formed that the number n of unit elements are equidistantly spaced apart from each other between the adjacent S and N poles of the magnetization pattern in each of the tracks 53A-53C.

Figure 16:
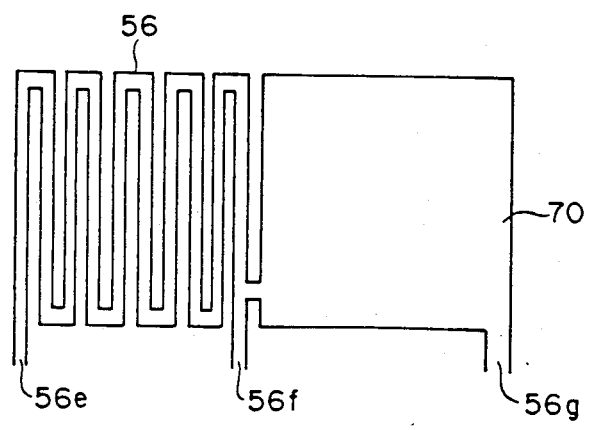
FIG. 16 is a top view showing another example of a detection element.

In addition to the construction just described above, it is possible to employ the construction of a sensor as shown in FIG. 16. FIG. 16 shows the construction in which the temperature compensation resistor $R_2$ which is used in the detection circuit described above with reference to FIG. 2 is formed integral on a substrate 5. In FIG. 16, reference numeral 70 represents a resistor which has a temperature coefficient of electrical resistance equal to that of an MR sensor 56 and which is formed integral with the MR sensor 56 over an area which exhibits a desired resistance. Terminals 56e, 56f and 56g are extended from the MR sensor 56, a resistor 70 and a junction therebetween and are connected to the reference resistors $R_3$ and $R_4$, whereby a detection circuit capable of temperature compensation is provided.

So far, the present invention has been described in detail with reference to the rotary encoder unit, but it is to be understood that the present invention may be equally applied to a linear encoder unit in which a track to be detected is rectilinear. It is, of course, possible to attain the same effects even when the present invention is applied to an encoder unit in which, instead of an object to be detected, a detector is displaced. Furthermore, the number of tracks to be detected is not limited to three and any number of tracks may be used.

Figure 5:
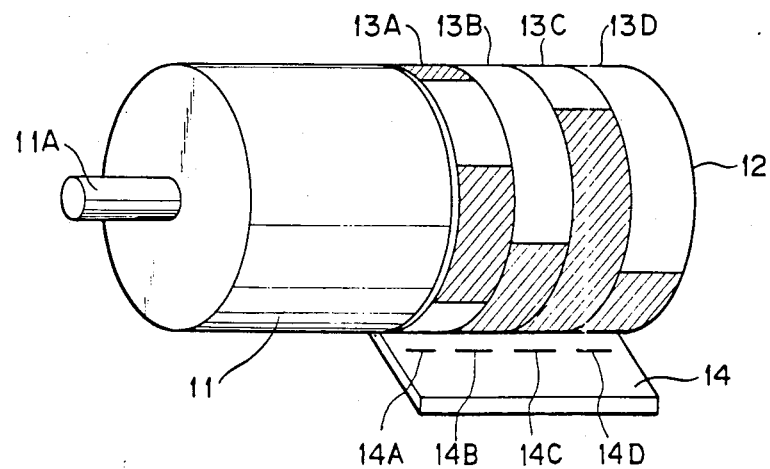
FIG. 5 is a perspective view illustrating another prior art rotary encoder unit.
Figure 17:
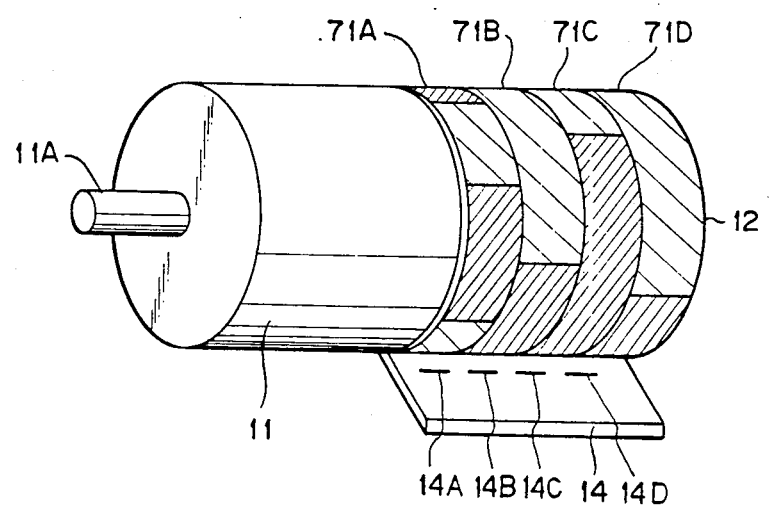
FIG. 17 is a perspective view showing a second embodiment of an encoder unit in accordance with the present invention.

FIG. 17 shows a second embodiment of an encoder unit in accordance with the present invention. The same reference numerals are used to designate similar parts in FIGS. 5 and 17 and those parts already described with reference to FIG. 5 shall not be described. The second embodiment is different from the prior art rotary encoder unit shown in FIG. 5 in that the magnetization patterns of tracks 71A-71D are different from those of the tracks 13A13D. Each of the tracks 13A-13D shown in FIG. 5 has a gray code consisting of magnetized regions and unmagnetized or demagnetized regions, but in this embodiment, a special magnetization pattern is formed in a region which corresponds to a demagnetized region in the prior art rotary encoder unit.

Figure 18A:
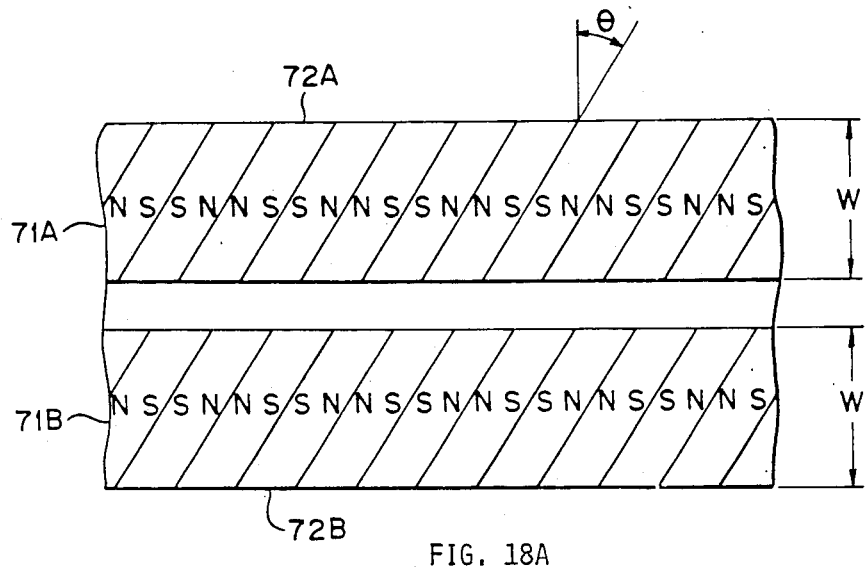
FIGS. 18A and 18B are developed views used to explain the magnetized regions in respective tracks.
Figure 18B:
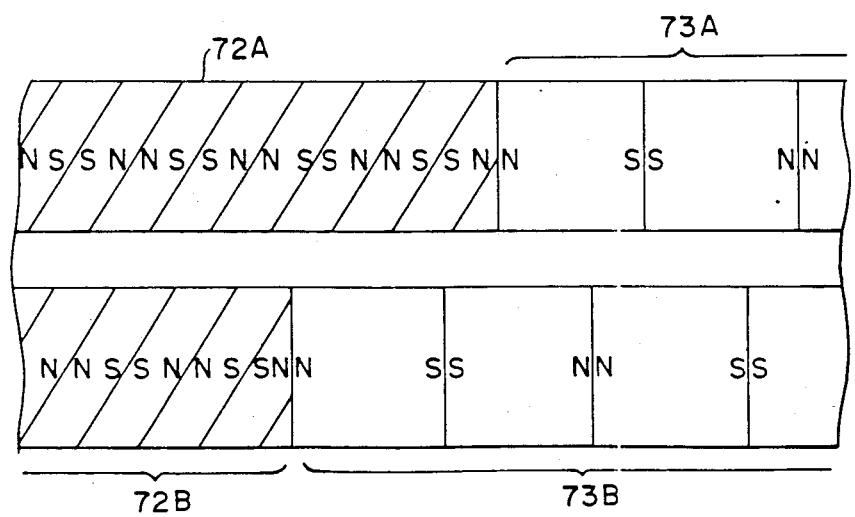

Referring now to FIGS. 18A and 18B, the magnetized patterns and the method for forming them will be described. A magnetic drum 12 shown in FIG. 18A has two tracks 71A and 71B each of which has a magnetization pattern which has an azimuth angle $\theta$ and is extended over the whole cylindrical surface of the magnetic drum 12.

Now the angle of inclination θ of the magnetization pattern relative to the longitudinal direction of each track will be discussed. Since the region having the magnetization pattern is used as in the case of the unmagnetized region described above, the angle θ is so determined that the magnetic field applied from the magnetization pattern to one unit MR element is cancelled. Therefore, when the pitch of the magnetization pattern is p', the angle θ is given by $$\theta = \tan^{-1}(2ip'/W)$$

where i is an integer except zero. The regions which are formed with such magnetization patterns are referred to as "the azimuth regions" 72A and 72B.

Thereafter, the azimuth regions 72A and 72B are superposed on the tracks so that the magnetized regions which correspond to a predetermined gray code like the magnetized regions 31 (See FIG. 7) are defined as shown in FIG. 18B. In order to differentiate such magnetized regions from the prior art magnetized regions 31, they are referred to as "the signal regions 73A, 73B and so on" hereinafter in this specification.

Figure 7:
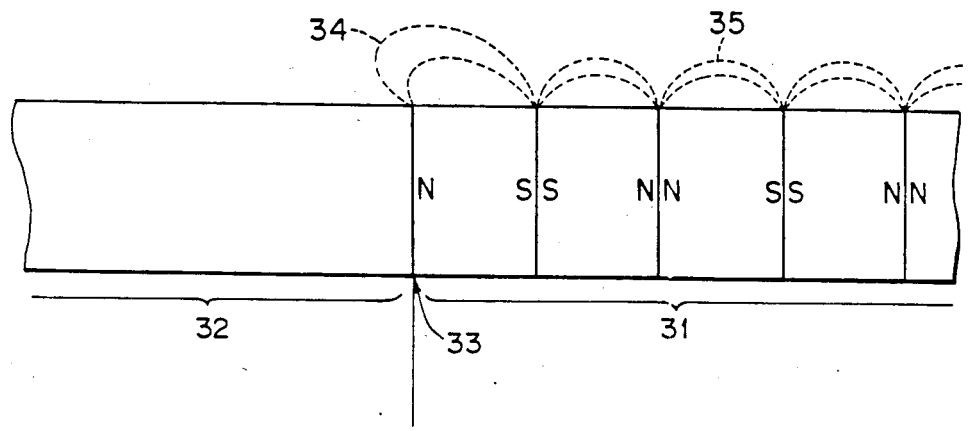
FIG. 7 is a developed view illustrating a magnetization pattern of a track and a leakage flux.
Figure 19A:
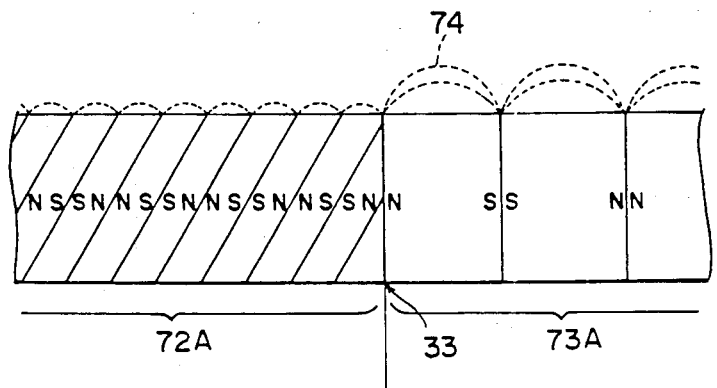
FIG. 19A is a developed view illustrating the expansion of the magnetic fluxes from the magnetized zones.
Figure 19B:
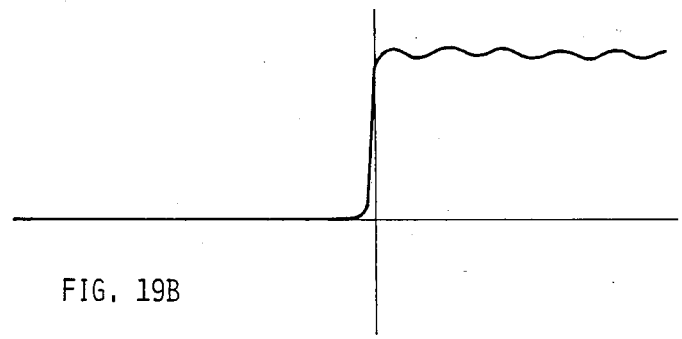
FIGS. 19B and 19C show the output waveforms.
Figure 19C:
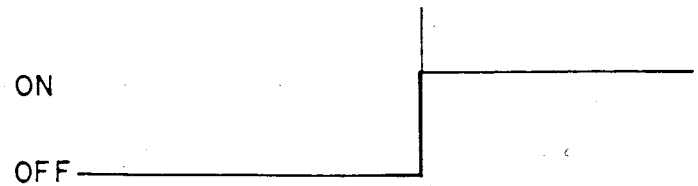

When the magnetization patterns are defined in the manner described above, the magnetic fluxes produced by the signal and azimuth regions repel each other at the boundary 33 between the signal region 73A and the azimuth region 72A as shown in FIG. 19A so that the expansion of the magnetic flux 74 becomes smaller as compared with the prior art shown in FIG. 7 and is substantially similar to the expansion of the magnetic flux in the signal region 73A, except for the boundary region. As a result, as shown in FIG. 19B, the signal derived from the MR sensor rises as the MR sensor passes past the boundary 33. Therefore, the output which is reshaped by a comparator or the like rises precisely at the moment when the MR sensor passes past the boundary 33. Therefore, no detection error occurs. In the azimuth region 72A, the magnetic fields applied to the MR sensor are out of phase so that the magnetic fields are cancelled at both ends of one unit MR element so that no detection signal is obtained.

Because of the formation of the azimuth region, the expansion of the magnetic field in the direction of the adjacent track at the boundary 33 becomes smaller as compared with the prior art so that the distance between the adjacent tracks can be decreased. As a result, the encoder unit can be made compact in size as a whole.

Figure 20A:
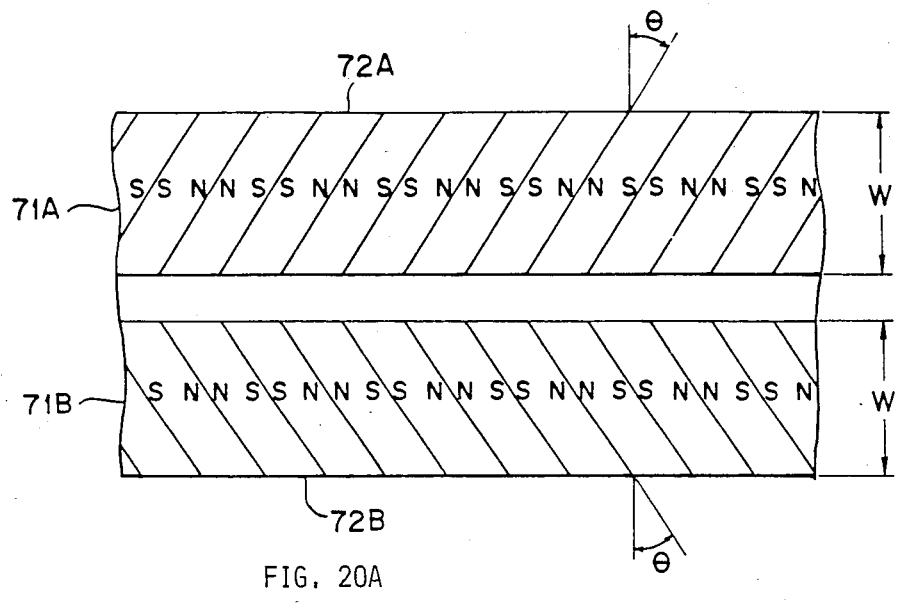
FIGS. 20A and 20B are developed views used to explain the magnetized regions in further embodiments, respectively, of the present invention.
Figure 20B:
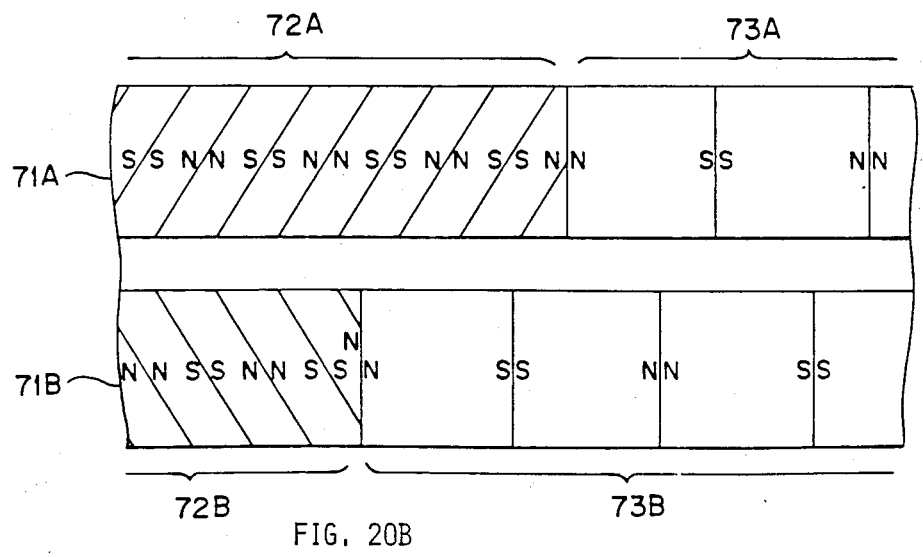

In the second embodiment, the direction of magnetization of the azimuth region in one track is same as the direction of magnetization of the azimuth region in the adjacent track, but, as shown in FIG. 20A, the directions of magnetization of the azimuth regions in the adjacent tracks may be symmetrical about the direction of magnetization of the signal region and thereafter the signal regions 73A, 73B and so on may be defined in the manner described above as shown in FIG. 20B. Then interference between the adjacent tracks can be further minimized so that the distance between the adjacent tracks can be decreased and consequently the encoder unit can be compact in size.

In the second embodiment, the direction of magnetization of each of the signal regions 73A, 73B and so on is not inclined relative to the direction in which the MR sensor is displaced, but it is to be understood that the signal regions may be inclined at an angle relative to the rotating shaft of the magnetic drum. In this case, when the directions of magnetization in the adjacent tracks are different, crosstalk in the signal regions between the adjacent tracks can be decreased and consequently the distance between the adjacent tracks can be reduced.

The number of tracks to be detected is not limited to four and any number of tracks may be used. Especially, in a video tape recorder, when only the phase of a cylinder to a rotary magnetic head is detected, the phase is able to be detected by a single track and a corresponding single sensor.

Figure 21:
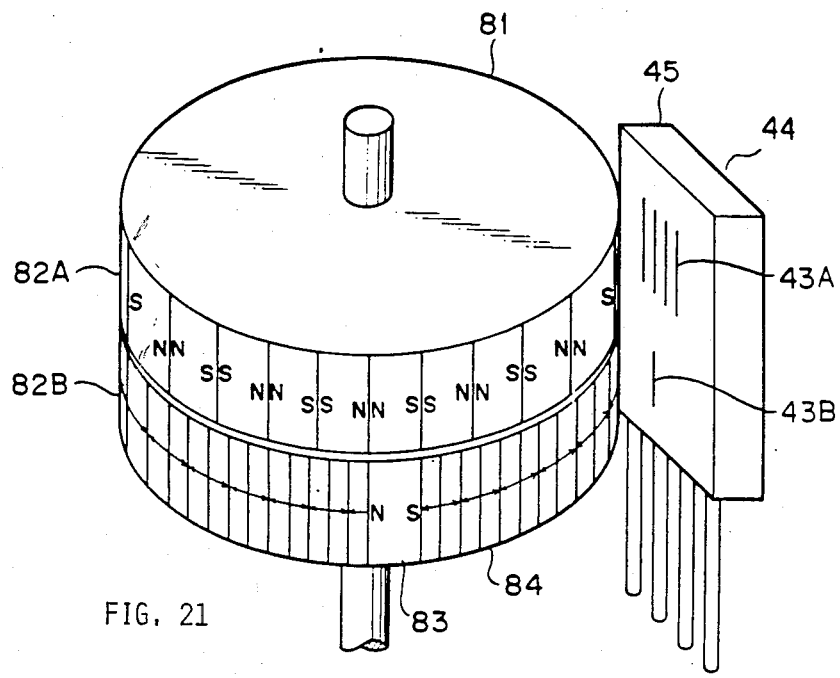
FIG. 21 is a perspective view illustrating a third embodiment of an encoder unit in accordance with the present invention.

FIG. 21 shows a third embodiment of a rotary encoder unit in accordance with the present invention. In the third embodiment, the incremental layer 82A of a rotor 81 is formed with the same magnetization pattern with a predetermined pitch as that shown in FIG. 8. The index layer 82B is formed with one magnetized region 83 at a reference position which has the same recording wavelength as that of the incremental layer 82A, and narrow magnetized regions each having a shorter recording wavelength are formed continuously on both sides of the magnetized region 83.

Figure 8:
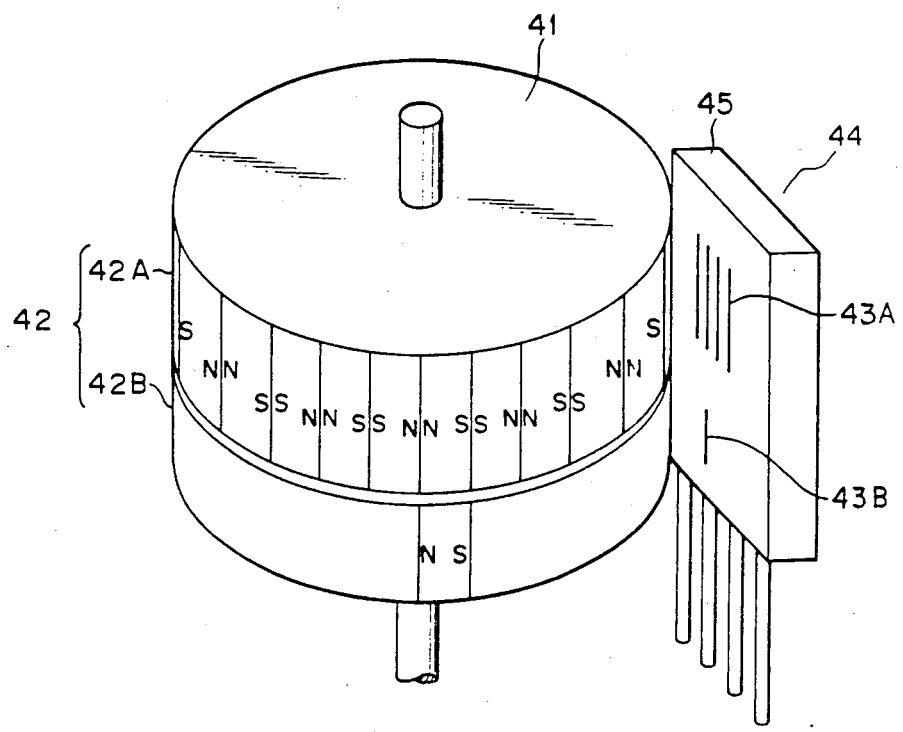
FIG. 8 is a perspective view illustrating a further prior art rotary encoder unit.
Figure 9:
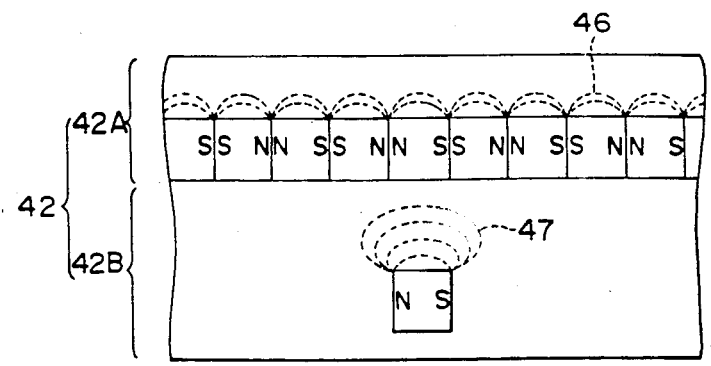
FIG. 9 is a developed view used to explain the magnetization pattern and the leakage flux of the rotor shown in FIG. 10.
Figure 10A:
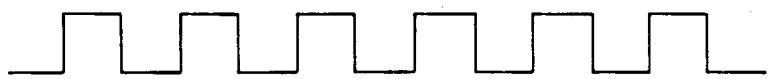
FIGS. 10A and 10B show the detection output waveforms obtained when the MR sensors scan the magnetization patterns shown in FIG. 9.
Figure 10B:
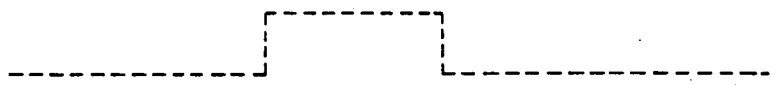
Figure 10C:
FIG. 10C shows a preferable output waveform expected to be obtained when the MR sensor scans the index layer.

MR sensors in the third embodiment are substantially similar in construction to that shown in FIG. 8.

Figure 22:
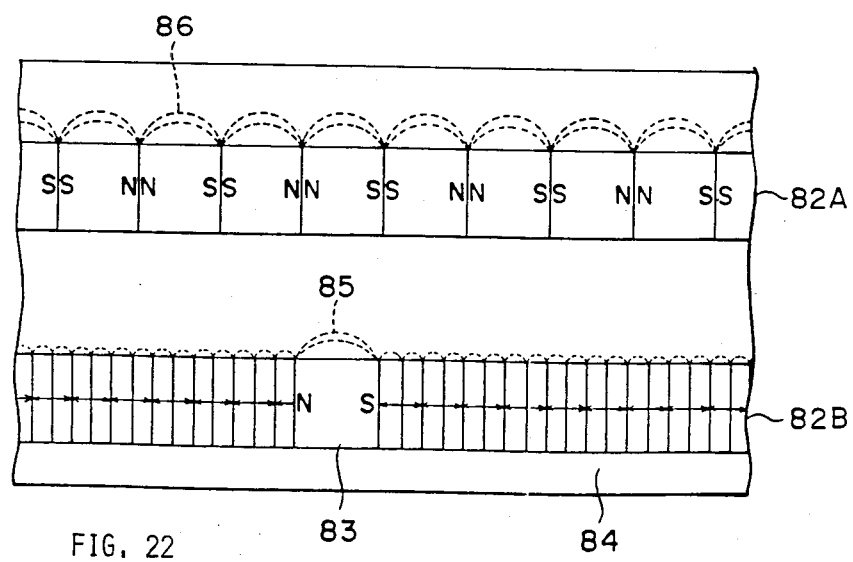
FIG. 22 is a developed view used to explain the magnetic flux distributions of the magnetized regions.

When the magnetization patterns are defined in the manner described above, the index layer 82B has a magnetic flux distribution as shown in FIG. 22. The S pole of the narrow magnetized region 84 adjacent to the reference-position magnetized region 83 is located adjacent to the S pole of the reference-position magnetized region 83 while the N pole of the narrow magnetized region 84 adjacent the reference-position magnetized region 83 is located adjacent to the N pole of the reference-position magnetized region 83 so that, due to the repulsion between the same poles, the expansion of the magnetic flux 85 of the magnetized region 83 is reduced to the same degree as the magnetic flux 86 of the incremental layer 82A.

Figure 23A:
FIGS. 23A and 23B show the waveforms of the outputs derived from detection means when the latter scan an incremental layer and an index layer, respectively.
Figure 23B:
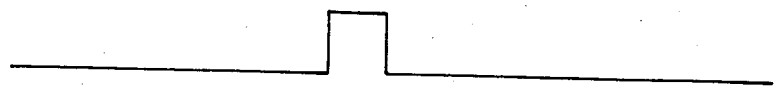

Therefore, when the MR sensor detects the magnetic fields in the index layer 82B, the output waveform shown in FIG. 23B is obtained. The pulse duration of the output waveform shown in FIG. 23B is substantially equal to that of the output waveform derived from the incremental layer 82A as shown in FIG. 23A. As a result, no error occurs in the detection of the reference position regardless of the direction of rotation of the rotor.

Since the recording wavelength of the narrow magnetized region 84 is sufficiently short, the extension of the magnetic flux from the cylindrical surface of the rotor toward the MR sensor is less so that the magnetic flux hardly reaches the MR sensor due to spacing loss. An optimum recording wavelength of the narrow magnetized region 84 is determined depending upon the gap between the MR sensor and the rotor, the sensitivity of the MR sensor, the wavelength of the reference-position magnetized region 83 and so on. For instance, when the gap between the MR sensor and the rotor is 0.1 mm and the stripe width of the unit elements of the MR sensor is 10 μm, it has been confirmed that the recording wavelength of the narrow magnetized region 84 must be less than ¼ of the recording wavelength of the reference-position magnetized region 83.

Figure 24:
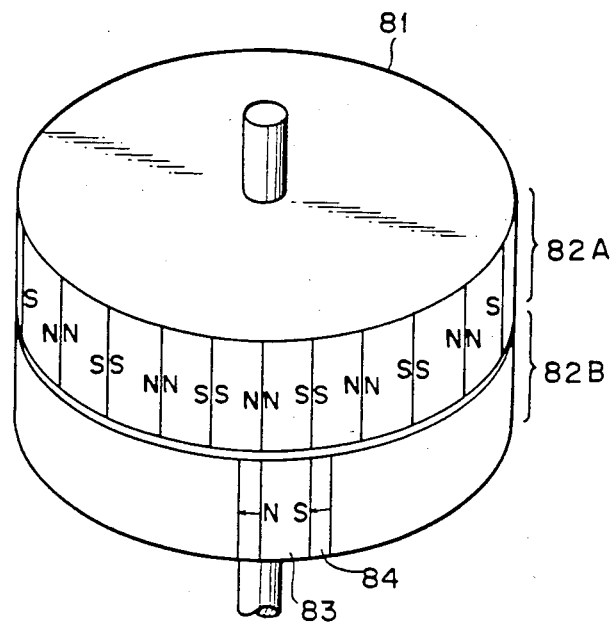
FIG. 24 is a perspective view showing another embodiment of a rotor in accordance with the present invention.
Figure 25A:
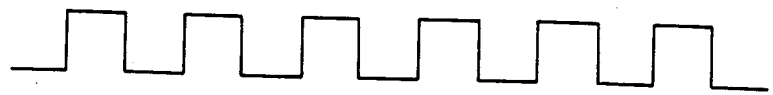
Figure 25B:
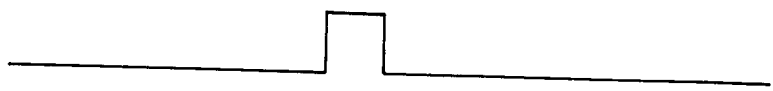
Figure 26:
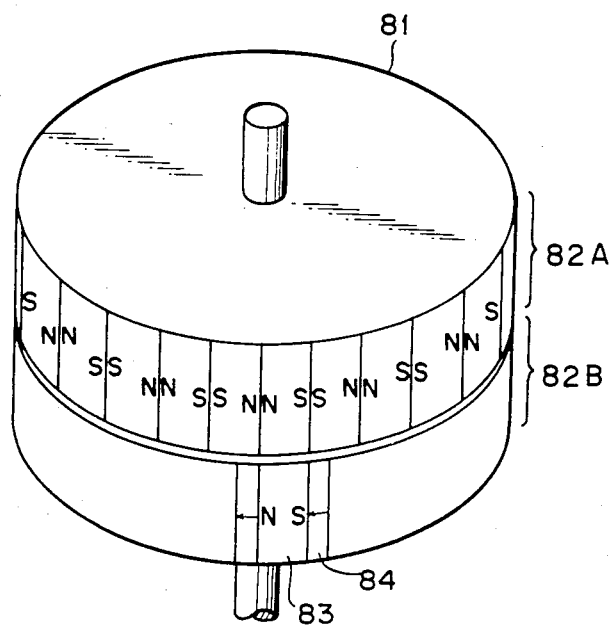

In FIG. 21, the narrow magnetized regions 84 are defined on both sides of the reference-position magnetized region 83 around the whole periphery of the cylindrical surface of the rotor, but the same effects can be obtained even when two magnetized regions having a short wavelength are defined on both sides of the reference-position magnetized region 83 as shown in FIG. 24.

So far the present invention has been described in detail with reference to the rotary encoder unit, but it is to be understood that the present invention may equally applied to a linear encoder unit in which the tracks are extended in a straight line.

As described above, the encoder unit in accordance with the present invention can detect the position of a rotor with a high degree of accuracy and in a reliable manner regardless of the relative position between the rotor and the magnetoresistance effect element. Furthermore, even though the construction of the encoder unit in accordance with the present invention is simple, the detection accuracy can be remarkably improved. In addition, the encoder unit of the present invention can be made compact in size. Moreover, the expansion of the magnetic flux for detecting a reference position can be narrowed and the detection error can be reduced to a minimum.

What is claimed is:

1. An encoder unit comprising:
   an object to be detected which has a plurality of tracks each alternately having a first region having a periodic magnetization pattern and a second region having no magnetization pattern, the length of said second region being greater than the period of said periodic magnetization pattern of said first region; and
   a detector for detecting said object to be detected having a plurality of sensors disposed in opposed relationship with said object to be detected and oriented in the direction which intersects the direction of the magnetic flux of the magnetized pattern of said first region, each of said plurality of sensors having a plurality of unit magnetoresistance effect elements which are equidistantly spaced apart from each other and which are connected in series, the spacing between adjacent elements of said sensors being less than the length of the period of said magnetization pattern.

2. An encoder unit as claimed in claim 1, wherein the spacing between adjacent elements of said sensors is one quarter of the length of the period of said magnetization pattern.

3. An encoder unit as claimed in claim 1, wherein the number n of said unit magnetoresistance effect elements of said sensor is given by $$n = P/p$$

where P is one-half of the length of the period of said magnetization pattern and p is the spacing between adjacent elements of said plurality of unit magnetoresistance effect elements.

4. An encoder unit as claimed in claim 1, wherein said each sensor including magnetoresistance effect elements is connected in series with a resistor made of a material having the same temperature coefficient of electrical resistance as that of said magnetoresistance effect element.

5. An encoder unit as claimed in claim 1, wherein the positions of said first and said second regions in said plurality of tracks are different from each other relative to the direction of magnetization.

6. An encoder unit as claimed in claim 1, wherein the lengths of said first and said second regions in said plurality of tracks are different from each other relative to the direction of magnetization.

* * * * *